Nov. 18, 1958 W. MUENCH 2,860,623
LONG CUTTING EDGE DIAMOND TOOL FOR DRESSING GRINDING WHEELS
Filed May 14, 1953 3 Sheets-Sheet 1
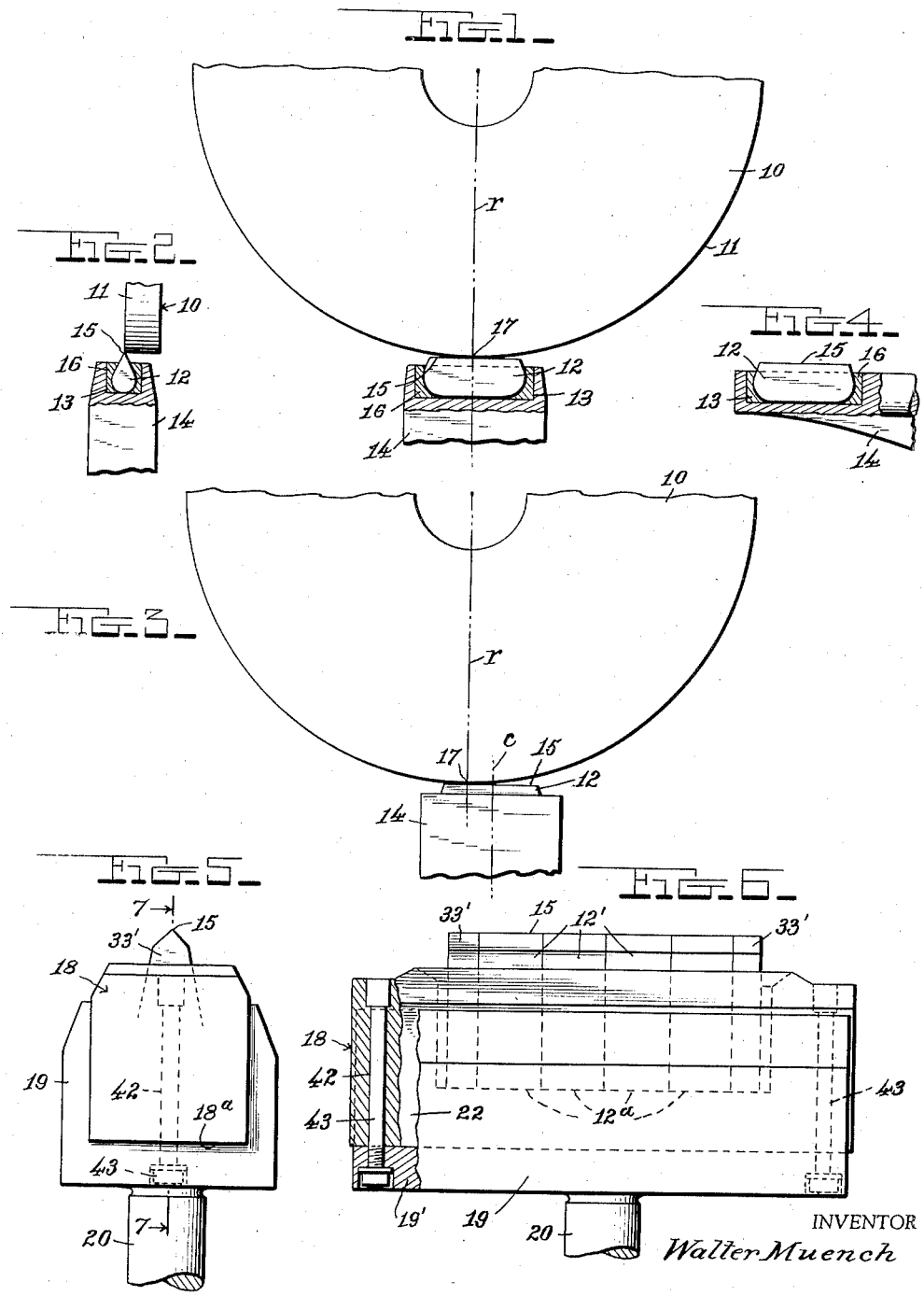
INVENTOR
Walter Muench
ATTORNEYS

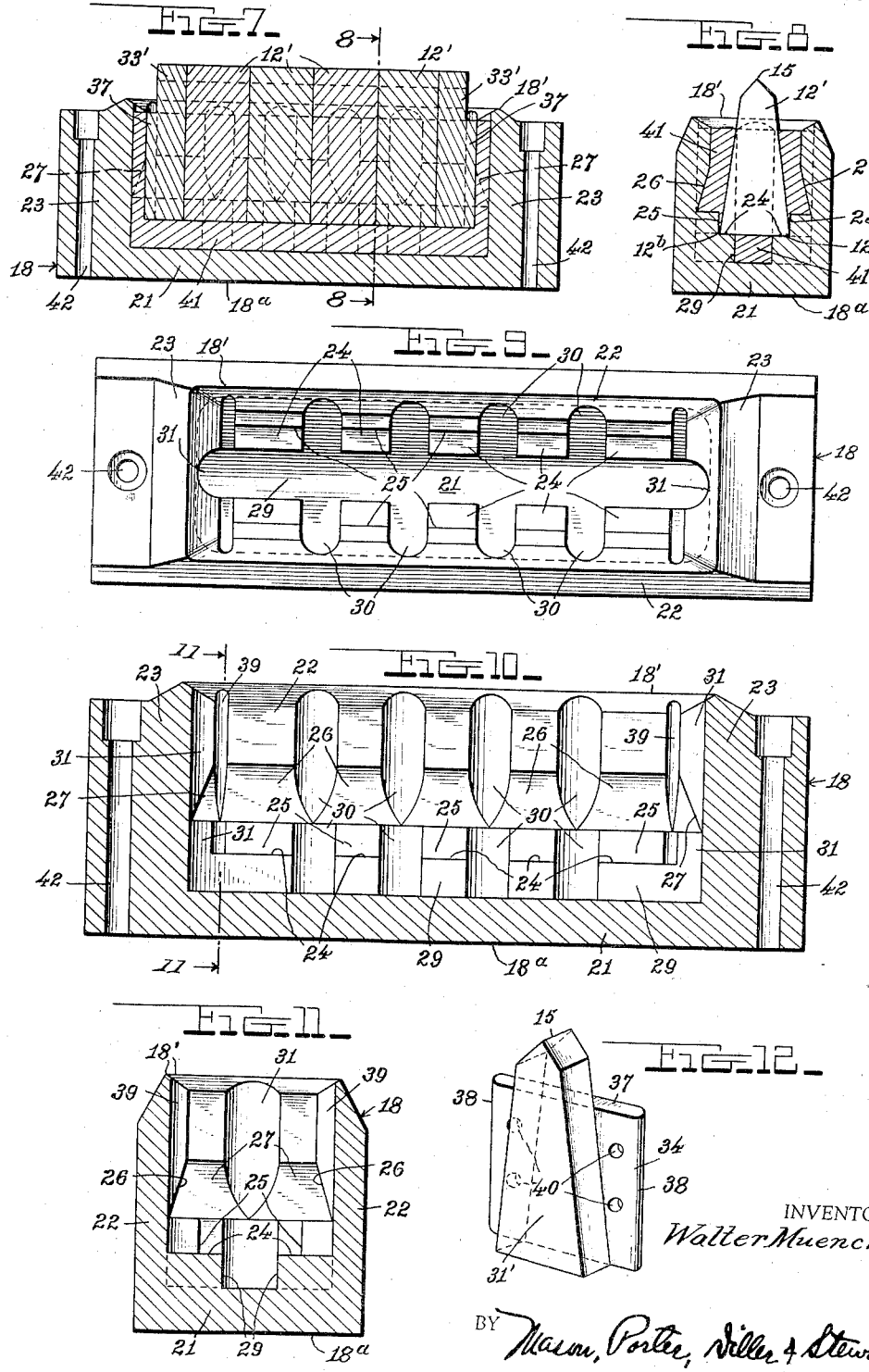

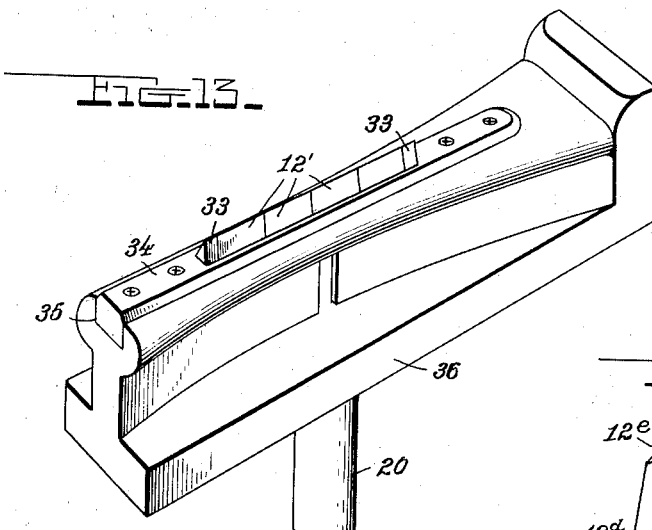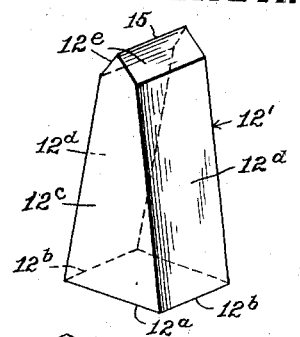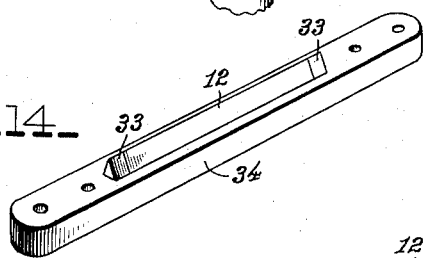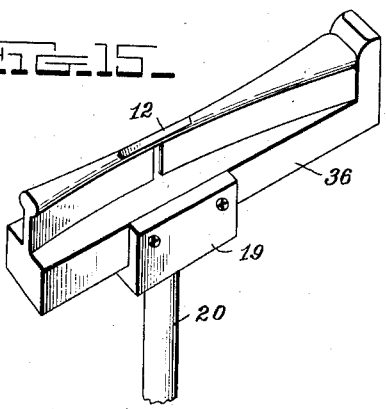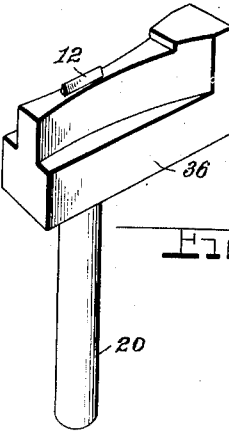

United States Patent Office 2,860,623
Patented Nov. 18, 1958

2,860,623

LONG CUTTING EDGE DIAMOND TOOL FOR DRESSING GRINDING WHEELS

Walter Muench, Newark, N. J., assignor to Walter Muench, Incorporated, Newark, N. J., a corporation of New Jersey Application May 14, 1953, Serial No. 354,917

6 Claims. (Cl. 125—39)

This invention relates to improvements in diamond tools especially designed for angular, convex and concave profiling or straight dressing of grinding wheels.

A diamond tool of the type stated, consists generally in a suitable holder and an industrial grade diamond firmly secured therein, and projecting slightly therefrom to present a cutting extremity to engage the work. Usually the projecting portion is ground to a conical form, and is known in the trade as a "needle point diamond." The angle of the conical cut varies to suit the specific work for which the tool is designed. A fine pointed diamond as above mentioned, soon wears away with constant use, and presents a flat or rounded surface to the work, which is damaging to the wheel being dressed if not quickly detected and replaced with a new or sharper tool.

To minimize this rapid deterioration of the tool, a so-called "chisel edged tool" has been devised so as to present a larger wearing area to the work. Such tools are manufactured by forming a chisel edge on one end of the diamond, the greater portion of the diamond being embedded in the metal holder with the major axis of the diamond in alignment with the vertical axis of the holder. Such tools are used with the chisel edge extending transversely of the path of movement of the work, and with the entire breadth of said edge in constant engagement with the work. In practice, it is found that the longitudinal corners of the chisel edge wear quickly off, with the result that what remains of the projecting end of the diamond, in a short time, resembles a polished pebble, having only curves and no sharp edge for cutting. Such rounded surfaces merely rub off a portion of the surface of the wheel and force the minutely fine detached particles into the grain of the wheel, resulting in a smooth polished surface which ruins the grinding efficiency of the wheel.

Furthermore, when a rounded diamond is being used for form dressing on a grinding wheel, the actual cutting spot cannot be accurately determined, and therefore cannot be set to the correct central axis line of the grinding wheel, which defect leads to imperfect results in the wheel, and subsequently to the work-piece that is to be ground. The width of such chisel edges as furnished to the trade varies in size from ⅛ inch to ³⁄₁₆ inch: the latter being substantially the practicable limit when cutting the stone transversely of its major axis, which is the present practice.

Also, when setting a used up pointed tool, or a chisel edged tool that is worn down, transversely of the path of peripheral movement of the work, it is difficult to get the cutting point or edge accurately centered, that is, in accurate radial alignment with the rotating work. This consumes much time and causes considerable eye strain.

The object of the present invention is to provide a dressing tool of the diamond type, which may be quickly and accurately centered with relation to the grinding wheel to be dressed.

A further and particular object of the invention is to provide a tool of the type mentioned having an elongated cutting edge which may be adjusted to bring fresh portions of the edge into operative engagement with the work without requiring resetting of the device.

A further object of the invention is to provide a chisel edged diamond tool of the character above stated, provided with means for protecting the end corners of the stone from chipping or breaking.

A further object of the invention is to provide a construction whereby a diamond cutting tool may be manufactured having a cutting edge of any desired length.

A further object is to provide a tool of the class stated, whereby after the stones have become so worn as to render the tool of little service, the tool may be repeatedly reconditioned by removing, resharpening and replacing the stones without warping the tool due to the intense heat to which the same is subjected during the process.

Other objects will appear hereinafter.

With the above stated objects in view the invention consists generally in providing the usual or any preferred tool holder with a rigidly mounted cutting diamond having a long cutting edge adapted to engage the wheel to be dressed tangential to the periphery thereof, that is with said cutting edge substantially in alignment with the path of travel of said periphery.

The invention further consists in a tool as above stated which may be adjusted longitudinally of said cutting edge to bring fresh portions of the cutting edge into engagement with the work without the necessity of resetting the device.

The invention further consists in a chisel edged diamond cutting element in combination with protecting elements arranged at the ends thereof to prevent chipping of the ends of said cutting element.

The invention further consists in various details of construction and arrangement of parts, as will be described hereinafter and particularly pointed out in the claims.

The invention will be more readily understood by reference to the accompanying drawings, forming a part of this specification and in which:

Figure 1 is a detail side elevation of a grinding wheel, with a diamond cutter embodying the invention in operative position with relation thereto;

Figure 2 is a detail view at right angles to that illustrated in Figure 1;

Figure 3 is a view similar to Figure 1, but illustrating a shift in the relative positions of the tool and the work;

Figure 4 is a detail section of a modified form of the diamond holder, such as used in cutting concave radii;

Figure 5 is an end view of a modified form of the invention wherein a plurality of aligned stones are used to form the cutting edge;

Figure 6 is a side elevation of the same;

Figure 7 is a vertical longitudinal section thereof;

Figure 8 is a transverse section on the line 8—8 of Figure 7;

Figure 9 is a top plan view of the metal casing in which the cutter elements are to be mounted;

Figure 10 is a vertical longitudinal section of the same;

Figure 11 is a transverse section on the line 11—11 of Figure 10;

Figure 12 is a perspective view of one of the end protecting elements;

Figure 12a is a perspective view of a stone such as is used in the composite form illustrated in Figures 6 to 8;

Figures 13 to 16 inclusive are perspective views of various forms of holders for the cutting element.

Referring to the drawings, 10 indicates a grinding wheel the periphery 11 of which is to be dressed; and 12 the stone or diamond cutter which is rigidly and securely mounted in the recess 13 in the tool holder 14, which holder may be of any desired form or construction. It is to be understood that the holder 14 may be rotated on a horizontal axis which may be adjusted with relation to cutting element, and also moved longitudinally toward or from the work in the usual manner in dressing wheels. The diamond cutter 12 may be formed of a single stone as illustrated in Figures 1 to 4 of the drawings, or may be a composite element as illustrated in Figures 5, 6 and 7, and as will be fully described hereinafter.

When a single stone is used, a large rectangular shaped stone is selected, having a length of approximately one inch or more; and a cutting edge 15 is ground along one longitudinal edge thereof substantially parallel to the major axis of the diamond, considering the length of the stone in its selected natural state, thereby presenting a long cutting edge to the work. In setting the stone or stones in a holder 14, when the tools are made separately, in contradistinction to mass production, a brazing alloy 16 is used, which may be fused by means of a blow-torch.

When a long straight cutting edge is presented tangentially to the periphery 11 of the wheel, the cutting point will be readily centered in radial alignment to the work, inasmuch as a straight line tangent to a circle is always perpendicular to the radius of the circle at the point of tangency; which is the correct position for accurate work. The edge 15 of the stone need not be centered at the point of contact 17 as will be seen by reference to Figure 3, wherein the line of center $c$ of the cutter is offset with relation to the radius $r$ at the point of contact 17.

It is evident that with this novel arrangement of the cutting edge 15, the cutting edge of the tool may be moved longitudinally to present successive points of contact at 17 as the edge wears, and that this may be accomplished without resetting the tool, as is necessary in the present practice when a worn stone is replaced by a new or sharper stone.

When a single stone is used, the length of the cutting edge is limited by the natural length of the stone. However, the present invention is not limited to the use of a single stone, but also includes the use of a composite structure formed of a plurality of similarly cut stones 12' arranged in alignment in a suitable mounting, as illustrated particularly in Figures 5, 6 and 7. It will be clear that by this arrangement the cutting edge 15 may be formed to any length found desirable or practical.

With the composite form of the invention, as shown in Figures 5 to 12, inclusive, the stones, instead of being mounted directly in the end of a tool shank for use in the so-called radius dressing fixtures, are preferably fused in an elongated casing 18, which casing is precision tooled to fit accurately into a precision machined channel-like element 19 having the usual mounting shank 20. See Figures 5 and 6.

Referring to Figures 5 to 12, inclusive, the steel casing 18 comprises a bottom 21, side walls 22 and end walls 23. Said casing is preferably formed of stainless steel having a high melting point. The casing 18 is formed with parallel series of footings 24 upon which the lower ends of the stones 12' are seated; and with a similar series of vertical abutments 25 rising from the footings 24 and against which the lower longitudinal edges 12$^b$ of the stones accurately fit, as illustrated in Figure 8, to prevent any lateral shifting of the stones during the process of manufacture. Above the abutments 25 the side walls 22 are undercut as at 26 for a purpose hereinafter described, and the end walls 23 are similarly undercut as at 27.

A channel 29 extends along the upper face of the bottom 21, and vertical channels 30 are milled in the inner faces of the side walls 22 and communicate at their lower ends with the longitudinal channel 29. Similar vertical channels 31 are formed in the inner faces of the end walls 23, and communicate with the ends of the channel 29.

Each of the stones 12' is precision machined to provide a flat bottom face 12$^a$ which fits accurately between the abutments 25, parallel vertical end faces 12$^c$, and side faces 12$^d$ which are slightly upwardly and inwardly inclined. The stones extend above the level of the upper edges 18' of the casing and terminate in accurately bevelled portions or planar faces 12$^e$ converging to form the continuous chisel or cutting edges 15 of the stones, which edges are in perfect alignment in the finished tool.

To protect the ends of the cutting edges of the stones, metallic end pieces or guards 33 are provided. Said guards 33, which are preferably made of the highest grade stainless steel, have the same transverse contour as the stone or stones, and fit accurately and firmly against the end faces of the stones as illustrated in Figures 6, 7, 13 and 14. In the forms illustrated in Figures 13 and 14, the end guides 33 and the stones 12 are molded in a bar 34 which is detachably secured within a groove or seat 35 formed in the tool holder 36.

In the form illustrated in Figures 5 to 12 inclusive, the end protecting guard members 33 are formed integrally with supporting plates 37, the vertical edges 38 of which are fitted in vertical grooves 39 milled in the side walls 22 of the casing 18. The stones 12' are accurately dressed so that when assembled in the casing 18, they will fit firmly between the guards 33, the latter also serving as clamps to force the stones into a close fitting unit as will be more fully described hereinafter.

After the stones 12' and guards 33 are assembled in the casing 18, a fire-brick funnel block or trough (not illustrated) is rested upon the upper edges 18' of the casing 18, said edges being bevelled as shown to receive and hold said trough in position during the operation of fusing the stone in place within the casing 18. Granular bronze alloy is then filled into the several channels 29, 30 and 31, and piled in the funnel above the level of the top of the casing. The assembled device is then placed within an oven (preferably electric), and the matrix metal melts and flows downwardly and fills all of the spaces within the casing. The fire brick is provided in order to hold sufficient metal granules to fill said spaces when the fusing substance melts. During the melting process the guards 33 and supporting plates 37 which are integral therewith, become very hot, and by the resultant expansion, clamp the several stones firmly together, and hold them so clamped as the fusing metal sets. Some of the melted metal flows into apertures 40 in the plates 37 thereby locking said clamping elements firmly in the matrix forms 41 within the casing 18. After the matrix metal is thoroughly melted and fills all the spaces in the casing 18, the device is transferred to a cooling oven where it is slowly cooled to a temperature at which it may be handled. It is obvious that the stones 12' and the clamping guard members 33 are completely embedded within the matrix metal 41, except the protruding cutting ends 15; and that the matrix form is securely locked within the casing by the undercuts 26 and 27 in the side and end walls 22 and 23.

In the form of the invention above described and as illustrated in Figures 5 to 12 inclusive, the ends of the stainless steel casing are preferably extended longitudinally and provided with bolt holes which are drilled with a precision jig; and corresponding holes 43 are likewise drilled in the base 19' of the channel shaped holder 19, to assure perfect alignment of the holes for bolts 43.

The outside dimensions of the casing are, at the start, held somewhat oversize because the casing will warp a little in the fusing process. When cooled off the bottom surface and the outside side walls of the casing are ground to accurate dimensions so as to have a perfect sliding fit without any looseness whatsoever in the channel of the element 19, shown in Figure 5.

Before the ground steel casing 18 is inserted in the tool holder 19, the row of diamond sections are touched up on a revolving lapping plate, in conjunction with the precision-adjusted stationary holding device to assure that the cutting edge 15 of the row of diamond sections is in perfect parallelism with the bottom surface 18a of the steel casing 18, and also in central alignment in relation to the sides of the casing.

After long use, the cutter edge 15 naturally shows signs of wear, thereby making it necessary to remove the steel casing 18 from the holder 19—20 for reconditioning the tool; which removal may be accomplished by removal of the bolts 43. The casing with the worn stones therein is sent to the factory for re-lapping to restore the cutting edge to proper condition and perfect alignment. This detachable construction of the tool and tool holder, also provides means whereby the cutting tool may be removed from the holder and replaced by a similar tool without disturbing the adjustments.

When the diamonds become too worn for further re-lapping, the tool is placed in an oven where the bronze spelter or bronze alloy is melted and removed together with the worn diamonds. As the casing 18 is an expensive, precision machined piece it is worth saving for further use and so new diamonds are fixed within the casing 18 in the same manner as above described in making the tool initially. However in this renewing process the casing with the new diamonds in it, is held in a very close fitting, extra large, open grooved stainless steel block so that, in the heating process, the casing 18 cannot warp out of shape lengthwise. Only after the big block has completely cooled and the new diamond holding casing with it, will the renewed unit be taken out of the heavy block. When such is done in structures wherein the shank 20 is integral with the casing, the shank and casing become warped and out of true with each other, due to the intense heat to which the device is subjected, so that the reconditioned tool is not reliably accurate. By having the steel casing separate from the shank as in the construction herein described, such warping and distortion is eliminated and the tool is always dependable for accurate work.

The form of the tool as illustrated in Figures 13 to 16 inclusive are especially designed for concave grooving of grinding wheels and those illustrated in Figures 15 and 16 are adapted for cutting grooves of exceptionally small concave radii. In all of the forms illustrated, the long edged cutter to be presented tangentially to the periphery of the work, is maintained.

While example forms of the invention are disclosed herein, it is to be understood that the structural arrangement of the parts may be additionally varied without departing from the spirit and scope of the invention as defined in the appended claims.

I claim:

1. In a device of the class described a cutting tool comprising a tool holder, a plurality of similar diamonds arranged side by side in said holder and having abutting and coextensive coplanar faces and coplanar faces converging to collectively form a single continuous straight cutting edge.

2. In a device of the class described, a cutting tool comprising a tool holder, a plurality of similar diamonds arranged side by side in said holder and having abutting and coextensive coplanar faces and coplanar faces converging to collectively form a single continuous straight cutting edge, and guard members firmly engaging the ends of said aligned diamonds to firmly hold said abutting faces together and protecting the extremities of the continuous straight cutting edge against corner wear.

3. In a device of the class described, a cutting tool comprising a tool holder, a plurality of similar diamonds arranged side by side in said holder and having abutting and coextensive coplanar faces and coplanar faces converging to collectively form a single continuous straight cutting edge, and guard members firmly engaging the ends of said diamonds to firmly hold said abutting faces together, the outer ends of said guard members being tapered to conform to the shape of said diamonds at and adjacent to said cutting edge extremities.

4. In a device of the class described, a cutting tool comprising a casing, a plurality of similar diamonds fixed side by side in said casing and having abutting and coextensive coplanar faces and coplanar faces converging to collectively form a single continuous straight cutting edge, and a tool holder comprising a channel member having a channel in which the casing is snugly received, means securing the casing in the channel, and a supporting shank on said channel member.

5. In a device of the class described, a cutting tool comprising a casing, a plurality of diamonds rigidly mounted in said casing, said diamonds having abutting and coextensive coplanar faces and coplanar faces converging to form a single continuous straight cutting edge, a supporting shank for said casing and means for detachably connecting said shank to said casing.

6. A diamond cutting tool for a grinding wheel dressing machine comprising a casing having a bottom, side walls and end walls, a plurality of cutting diamonds firmly mounted in said casing, said diamonds being upwardly tapered and terminating in angularly slanting cutting edges arranged in unbroken sequence longitudinally of said casing, said casing having footings for the bottom ends of said diamonds and spaced above said bottom, vertical abutments extending upwardly from said footings to snugly receive the bottom ends of said diamonds between the same, the inner faces of said side walls and said end walls of said casings above said abutments being undercut, and a metallic matrix formed in said casing, and in which the major portions of said diamonds are embedded, and said metallic matrix extending into said undercuts.

References Cited in the file of this patent

UNITED STATES PATENTS

| | | |
|---|---|---|
| 90,824 | Dickinson | June 1, 1869 |
| 295,394 | Hessels | Mar. 18, 1884 |
| 1,939,991 | Krusell | Dec. 19, 1933 |
| 2,092,180 | Porter | Sept. 7, 1937 |
| 2,207,869 | Monnier | July 16, 1940 |
| 2,421,926 | Coronel | June 10, 1947 |
| 2,642,059 | Muench | June 16, 1953 |

FOREIGN PATENTS

| | | |
|---|---|---|
| 261,703 | Switzerland | Sept. 1, 1949 |
| 550,906 | Great Britain | Jan. 29, 1943 |
| 574,427 | Great Britain | Jan. 4, 1946 |